(12) United States Patent
Mongillo, Jr. et al.

(10) Patent No.: US 11,781,439 B2
(45) Date of Patent: Oct. 10, 2023

(54) SEAL ARRANGEMENT FOR TURBINE ENGINE COMPONENT

(71) Applicant: United Technologies Corporation, Farmington, CT (US)

(72) Inventors: Dominic J. Mongillo, Jr., West Hartford, CT (US); Brandon W. Spangler, Vernon, CT (US); Lane Thornton, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 765 days.

(21) Appl. No.: 16/571,678

(22) Filed: Sep. 16, 2019

(65) Prior Publication Data
US 2021/0062667 A1 Mar. 4, 2021

Related U.S. Application Data

(62) Division of application No. 14/704,278, filed on May 5, 2015, now Pat. No. 10,458,264.

(51) Int. Cl.
*F01D 11/00* (2006.01)
*F01D 25/24* (2006.01)

(52) U.S. Cl.
CPC .......... *F01D 11/006* (2013.01); *F01D 11/005* (2013.01); *F01D 25/246* (2013.01);
(Continued)

(58) Field of Classification Search
CPC .... F01D 11/006; F01D 11/005; F01D 25/246; F01D 2240/11; F01D 2240/57; F01D 2250/182
See application file for complete search history.

(56) References Cited

U.S. PATENT DOCUMENTS 4,426,191 A * 1/1984 Brodell ................. F01D 25/246
                                                                  415/189
4,465,284 A   8/1984 Szema
(Continued)

FOREIGN PATENT DOCUMENTS

CH       665684 A5 *  5/1988  ............ F01D 11/008
EP     0816638 A2 *  1/1998  ............ F01D 11/008
(Continued)

OTHER PUBLICATIONS

European Search Report for European Patent Application No. 16168507 completed Aug. 26, 2016.

*Primary Examiner* — Vishal A Patel
(74) *Attorney, Agent, or Firm* — Carlson, Gaskey & Olds, P.C.

(57) ABSTRACT

A component for a gas turbine engine according to an example of the present disclosure includes, among other things, a body including a cold side surface adjacent to a mate face. A plurality of ridges extends from the cold side surface. A seal member abuts the plurality of ridges to define a plurality of cooling passages. The seal member is configured to move between a first position and a second position relative to the plurality of ridges. Each of the plurality of cooling passages includes a first inlet defined at the first position and a second, different inlet defined at the second position. A method of sealing between adjacent components of a gas turbine engine is also disclosed.

22 Claims, 10 Drawing Sheets

(52) U.S. Cl.
CPC ...... *F05D 2240/11* (2013.01); *F05D 2240/57* (2013.01); *F05D 2250/182* (2013.01); *Y02T 50/60* (2013.01)

(56) References Cited

U.S. PATENT DOCUMENTS

| | | | | |
|---|---|---|---|---|
| 4,650,395 | A | * | 3/1987 | Weidner .................. F01D 11/08 415/116 |
| 5,167,485 | A | * | 12/1992 | Starkweather ........ F01D 11/005 415/115 |
| 5,423,659 | A | | 6/1995 | Thompson |
| 5,513,955 | A | | 5/1996 | Barcza |
| 5,531,457 | A | | 7/1996 | Tibbott et al. |
| 6,340,285 | B1 | | 1/2002 | Gonyou et al. |
| 6,712,581 | B2 | | 3/2004 | Florjancic et al. |
| 8,240,981 | B2 | | 8/2012 | Spangler et al. |
| 8,905,708 | B2 | | 12/2014 | Weber |
| 9,416,675 | B2 | | 8/2016 | Lacy |
| 2013/0177383 | A1 | | 7/2013 | Winn et al. |
| 2013/0177412 | A1 | * | 7/2013 | Weber .................... F01D 11/005 415/209.3 |

FOREIGN PATENT DOCUMENTS

| | | |
|---|---|---|
| EP | 2615255 | 7/2013 |
| GB | 2239679 | 7/1991 |
| WO | 2007063128 | 6/2007 |

* cited by examiner

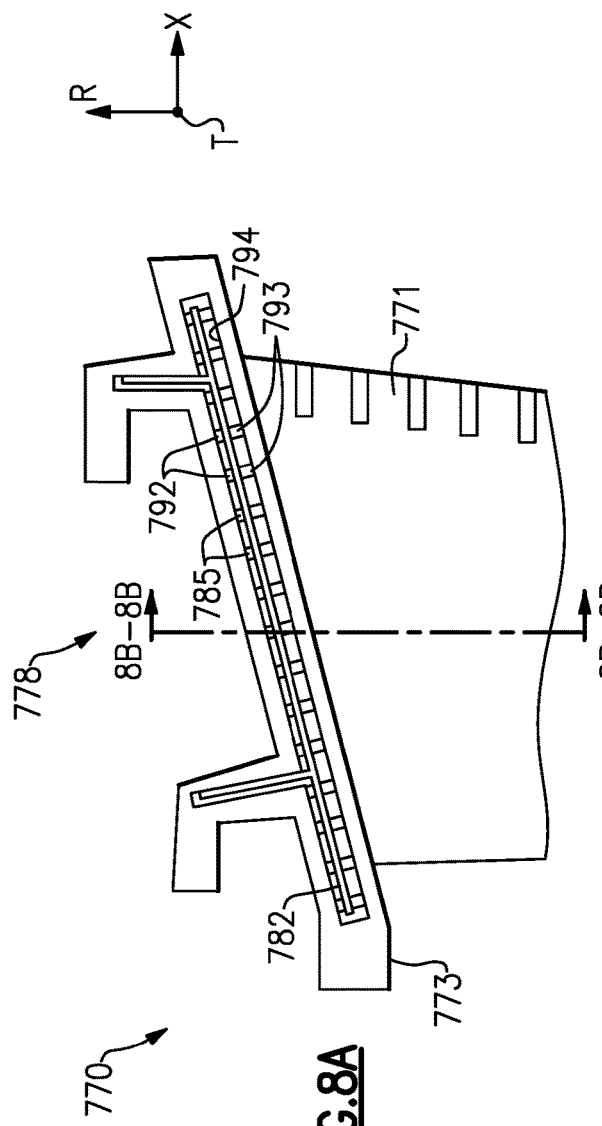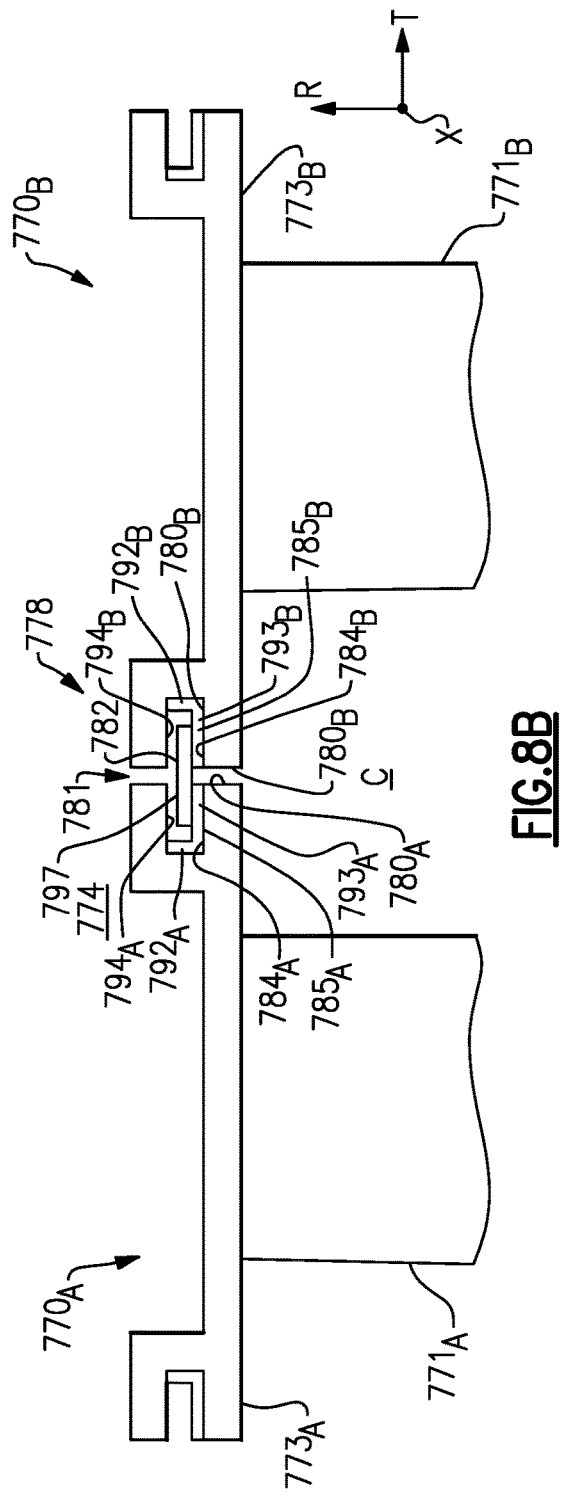

ial of U.S. patent application
SEAL ARRANGEMENT FOR TURBINE ENGINE COMPONENT

CROSS-REFERENCE TO RELATED APPLICATION

This application is a divisional of U.S. patent application Ser. No. 14/704,278 filed May 5, 2015.

BACKGROUND

This disclosure relates to impingement cooling for a component of a gas turbine engine, and more particularly to a seal arrangement having one or more ridges for cooling augmentation.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

Adjacent blades or vanes are distributed to define leakage gaps at adjacent mate faces. Cooling airflow is communicated through the leakage gaps to cool surfaces of the mate faces.

SUMMARY

A component for a gas turbine engine according to an example of the present disclosure includes a body including a cold side surface adjacent to a mate face. A plurality of ridges extends from the cold side surface. A seal member abuts the plurality of ridges to define a plurality of cooling passages. The seal member is configured to move between a first position and a second position relative to the plurality of ridges. Each of the plurality of cooling passages includes a first inlet defined at the first position and a second, different inlet defined at the second position.

In a further embodiment of any of the forgoing embodiments, each of the plurality of cooling passages includes an outlet adjacent to the mate face.

In a further embodiment of any of the forgoing embodiments, each of the plurality of ridges includes a first end and a second end. The outlet of each of the plurality of cooling passages is located at the second end, and the seal member is dimensioned such that the seal member is spaced a distance from the first end.

In a further embodiment of any of the forgoing embodiments, each of the plurality of ridges includes a first passage portion transverse to a second passage portion, and the second passage portion is configured to extend outboard of the seal member.

In a further embodiment of any of the forgoing embodiments, at least some of the plurality of ridges includes a radial retention feature extending from a respective one of the second passage portion. The radial retention feature is configured to abut a first surface of the seal member opposite from a second surface of the seal member abutting the first passage portion.

In a further embodiment of any of the forgoing embodiments, the cold side surface is located at a slot extending inwardly from the mate face, and the slot is configured to receive the seal member.

In a further embodiment of any of the forgoing embodiments, the component is one of an airfoil, a blade outer air seal (BOAS), and a combustor panel.

In a further embodiment of any of the forgoing embodiments, the airfoil includes an airfoil section extending from a platform, and the cold side surface is located at an undersurface of the platform.

In a further embodiment of any of the forgoing embodiments, the airfoil is a turbine blade.

A gas turbine engine according to an example of the present disclosure includes a first component including a first set of ridges protruding from a first cold side surface adjacent to a first mate face, and a second component including a second set of ridges protruding from a second cold side surface adjacent to a second mate face. The second mate face is circumferentially adjacent to the first mate face to define a leakage gap. A seal member abuts the first set of ridges to define a first set of cooling channels, and abuts the second set of ridges to define a second set of cooling channels. The seal member is spaced apart from the first cold side surface and the second cold side surface.

In a further embodiment of any of the forgoing embodiments, each of the first set and the second set of cooling channels includes an inlet spaced apart from the leakage gap and an outlet adjacent to the leakage gap.

In a further embodiment of any of the forgoing embodiments, each of the plurality of ridges includes a first passage portion transverse to a second passage portion, and the second passage portion is configured to bound relative movement of the seal member in a circumferential direction.

In a further embodiment of any of the forgoing embodiments, the seal member defines a first width in a circumferential direction, and outermost distal ends of the first set and the second set of ridges define a second width in the circumferential direction, and a ratio of the first width to the second width is equal to or less than 0.8.

A further embodiment of any of the foregoing embodiments includes the seal member including a sealing surface configured to abut the first set and the second set of ridges, and an outer surface spaced apart from the sealing surface. The first component and the second component are spaced from the outer surface at each circumferential position of the seal member.

In a further embodiment of any of the forgoing embodiments, each of the first component and the second component is one of an airfoil and a blade outer air seal (BOAS).

In a further embodiment of any of the forgoing embodiments, the first component is an airfoil. The airfoil includes an airfoil section extending from a platform. The platform includes an upper surface bounding a core flow path and an undersurface bounding a cooling cavity, and the first cold side surface is located at the undersurface of the platform.

A method of sealing between adjacent components of a gas turbine engine according to an example of the present disclosure includes positioning a feather seal across a leakage gap defined between mate faces of adjacent components, and along a plurality of ridges to define a plurality of cooling passages. The plurality of ridges are configured to protrude from cold side surfaces of the adjacent components such that the feather seal is spaced apart from the cold side surfaces.

A further embodiment of any of the foregoing embodiments includes communicating coolant from a cooling cavity to the plurality of cooling passages when an edge face of the feather seal is substantially aligned with ends of at least some of the plurality of ridges.

In a further embodiment of any of the forgoing embodiments, each of the plurality of cooling passages includes an inlet that is spaced apart from the mate faces at each position of the feather seal relative to the plurality of ridges.

In a further embodiment of any of the forgoing embodiments, each of the plurality of ridges includes a first passage portion transverse to a second passage portion, and the second passage portion is configured to bound relative movement of the feather seal along the plurality of ridges.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 8A illustrates a side view of a cooling arrangement for a vane.

FIG. 8B illustrates a cross-sectional view of the cooling arrangement along line 8B-8B of FIG. 8A.

DETAILED DESCRIPTION

Figure 1:
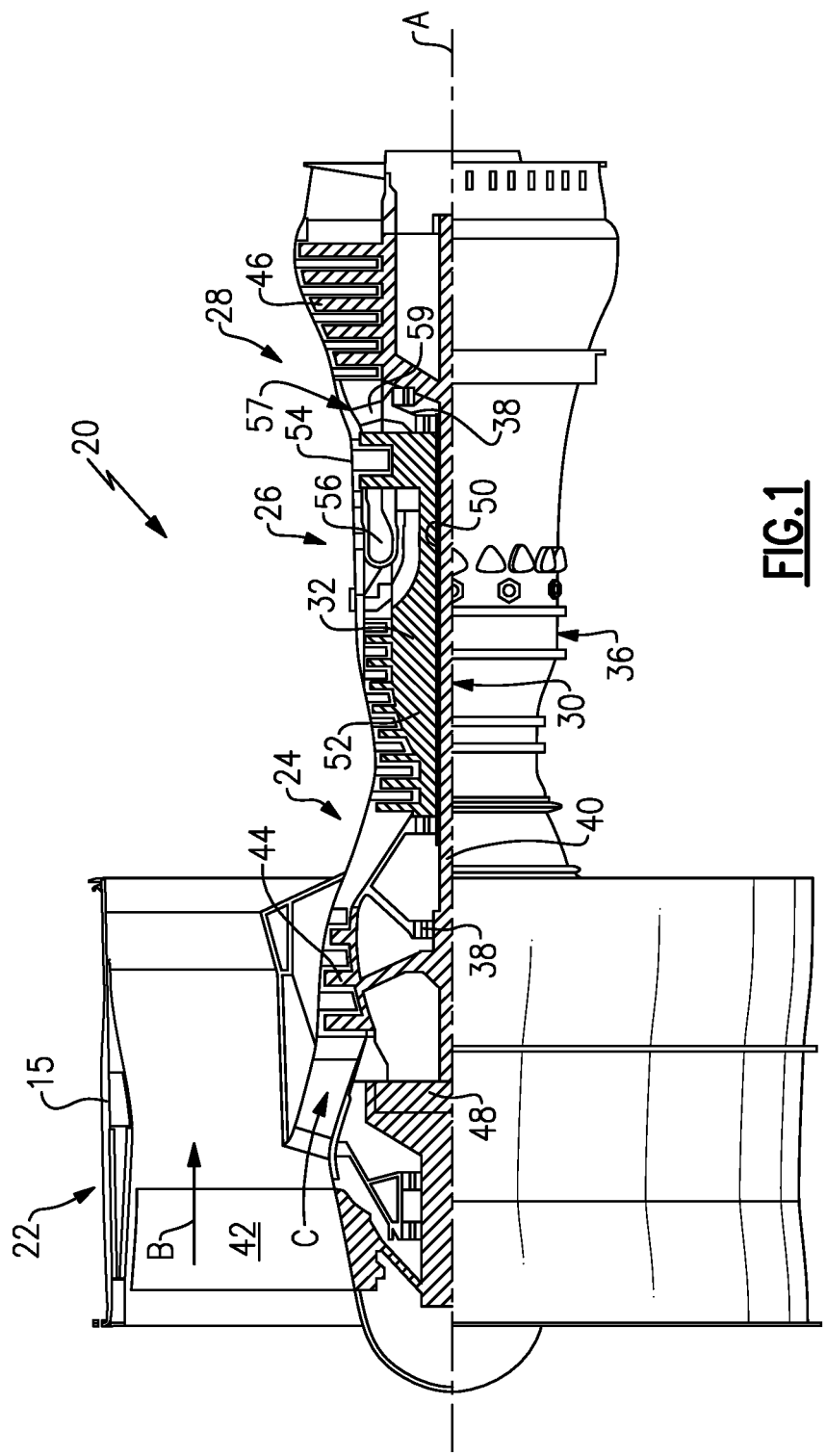
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

Figure 2:
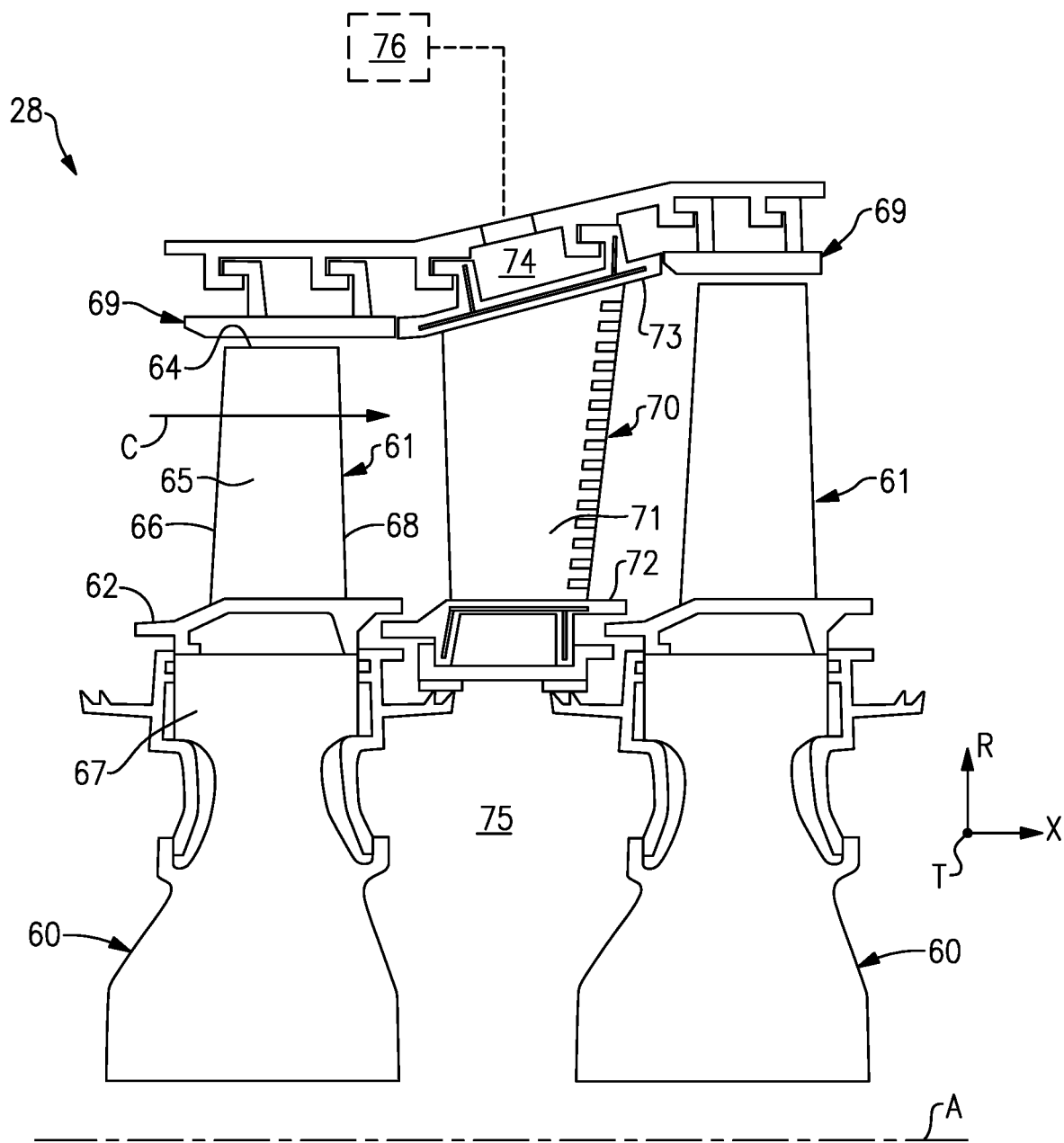
FIG. 2 schematically shows an airfoil arrangement for a turbine section.

FIG. 2 shows selected portions of the turbine section 28 including a rotor 60 carrying one or more airfoils 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise direction X between a leading edge 66 and a trailing edge 68. A root section 67 of the airfoil 61 is mounted to the rotor 60, for example. It should be understood that the airfoil 61 can alternatively be integrally formed with the rotor 60, which is sometimes referred to as an integrally bladed rotor (IBR). A blade outer air seal (BOAS) 69 is spaced radially outward from the tip 64 of the airfoil section 65. A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes multiple airfoils 61, vanes 70, and BOAS 69 arranged circumferentially about the engine axis A.

The outer platform 73 of vane 70 and BOAS 69 can define one or more outer cooling cavities 74. The platform 62 of airfoil 61 and the inner platform 72 of vane 70 can define one or more inner cooling cavities 75. The cooling cavities 74, 75 are configured to receive cooling flow from one or more cooling sources 76 to cool portions of the airfoil 61, BOAS 69 and/or vane 70. Cooling sources 76 can include bleed air from an upstream stage of the compressor section 24 (shown in FIG. 1), bypass air, or a secondary cooling system aboard the aircraft, for example. Each of the cooling cavities 74, 75 can extend in a thickness direction T between adjacent airfoils 61, BOAS 69 and/or vanes 70, for example.

FIGS. 3A to 3D illustrate an exemplary cooling arrangement 178 for an airfoil 161. Although the exemplary cooling arrangements discussed herein primarily refer to a turbine blade, the teachings herein can also be utilized for another portion of the engine 20, such as vane 70, an upstream stage of the compressor section 24, or combustor panels located in the combustor section 26 and defining portions of a combustion chamber, exhaust nozzles, or augmentors, for example. The exemplary cooling arrangements discussed herein can also be utilized adjacent to either of the cooling cavities 74, 75 and at various positions relative to the core flow path C.

Adjacent airfoils 161A and 161B have mate faces 180A, 180B arranged circumferentially about the engine axis A to define a leakage gap 181. The leakage gap 181 is configured to receive pressurized cooling airflow from cooling cavity 175 for providing cooling to the hot side surfaces of the mate faces 180A, 180B and reduce ingestion of hot gases from the core flow path C into the cooling cavity 175. The relatively warmer cooling airflow is discharged from the leakage gap 181 to the core flow path C.

A seal member 182 including one or more segments can be arranged adjacent to cold side surfaces 184A, 184B of the airfoil 161A, 161B, for example, and about the engine axis A to separate the cooling cavity 175 from the core flow path C. The cold side surfaces 184B, 184B of the airfoils 161A, 161B are adjacent to the mate faces 180A, 180B. In the illustrative embodiment, the cold side surfaces 184B, 184B are located at, or are otherwise defined by, undersurfaces 183A, 183B of platforms 162A, 162B, and the seal member 182 is a feather seal arranged adjacent to undersurfaces 183A, 183B. The feather seal can be fabricated from sheet metal made of nickel or cobalt, for example. Other materials for the seal member 182 can be utilized, including various high temperature Ni, Cobalt, or Inco alloys, or composite materials, for example.

Each airfoil 161A, 161B includes a plurality of ridges 185A, 185B extending radially or otherwise protruding from the cold side surfaces 184B, 184B of the platforms 162A, 162B. The ridges 185 are distributed both axially and circumferentially adjacent to the leakage gap 181 to define a plurality of grooves 186. Each of the ridges 185 includes a proximal (or first) end 190 adjacent to the leakage gap 181 or mate face 180, and a distal (or second) end 191 spaced apart from the leakage gap 181 or mate face 180. In the illustrative embodiment, the ridges 185A, 185B extend circumferentially from edges of the mate faces 180A, 180B. In an alternative embodiment, at least some of the ridges 185A, 185B are offset away from edges of the mate faces 180A, 180B.

The ridges 185A, 185B can be arranged at various orientations relative to the cold side surfaces 184A, 184B and mate faces 180A, 180B, such as substantially perpendicular or transverse relative orientations, and pitched (spaced) axially and/or circumferentially to provide a desired heat transfer and cooling augmentation to portions of the platform 162 adjacent the cooling passages 187. The relative orientation of the ridges 184A, 184B may be altered to increase wetted surface area, and to direct and regulate leakage flow to high heat load locations along the edges of the mate faces 180A, 180B. Additionally, the ridges 185A, 185B also improve platform creep capability by providing additional stiffening and lower local and bulk average bending stress of the platforms 162A, 162B.

Figure 3A:
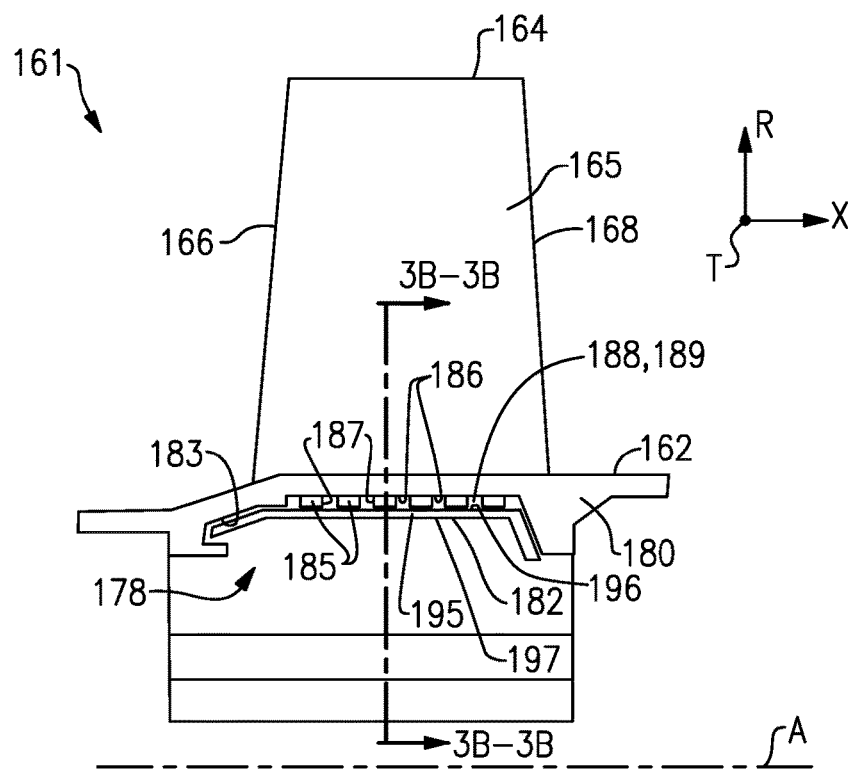
FIG. 3A illustrates a side view of a first embodiment of a cooling arrangement for an airfoil.
Figure 3B:
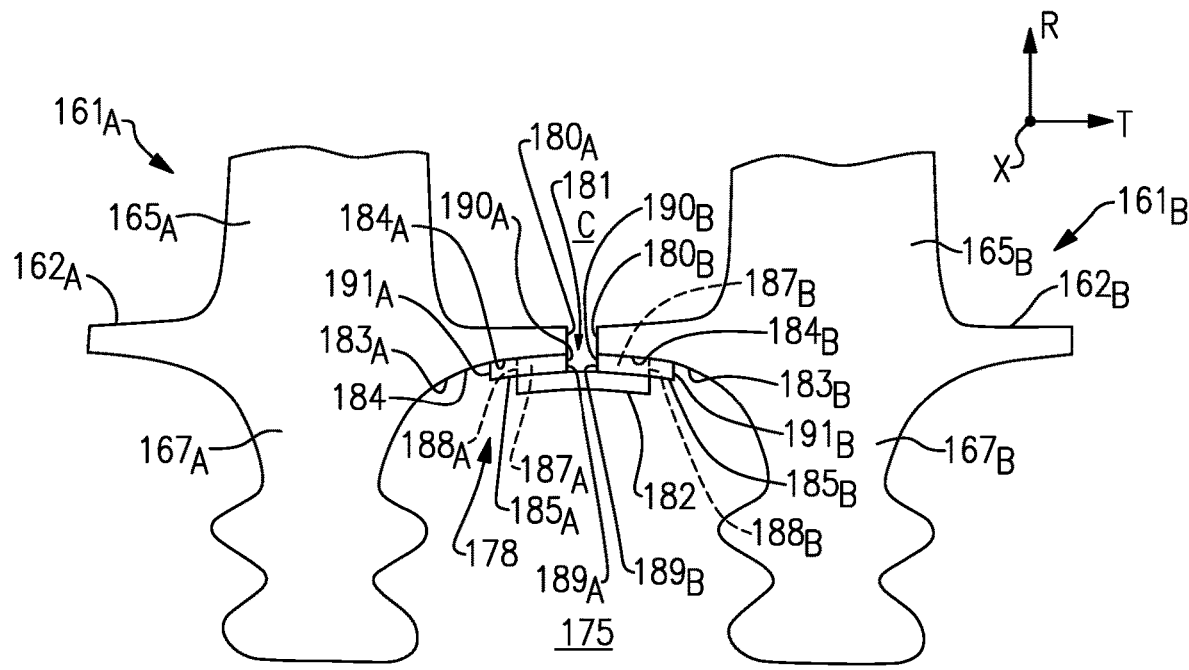
FIG. 3B illustrates a cross-sectional view of the cooling arrangement along line 3B-3B of FIG. 3A.
Figure 4B:
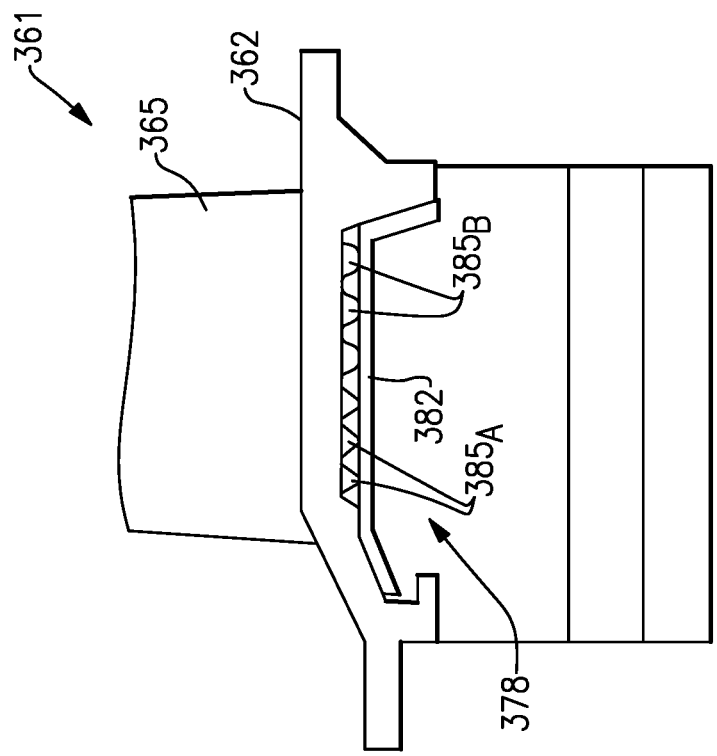
FIG. 4B illustrates a side view of a cooling arrangement for an airfoil having a plurality of ridges with various geometries.
Figure 4A:
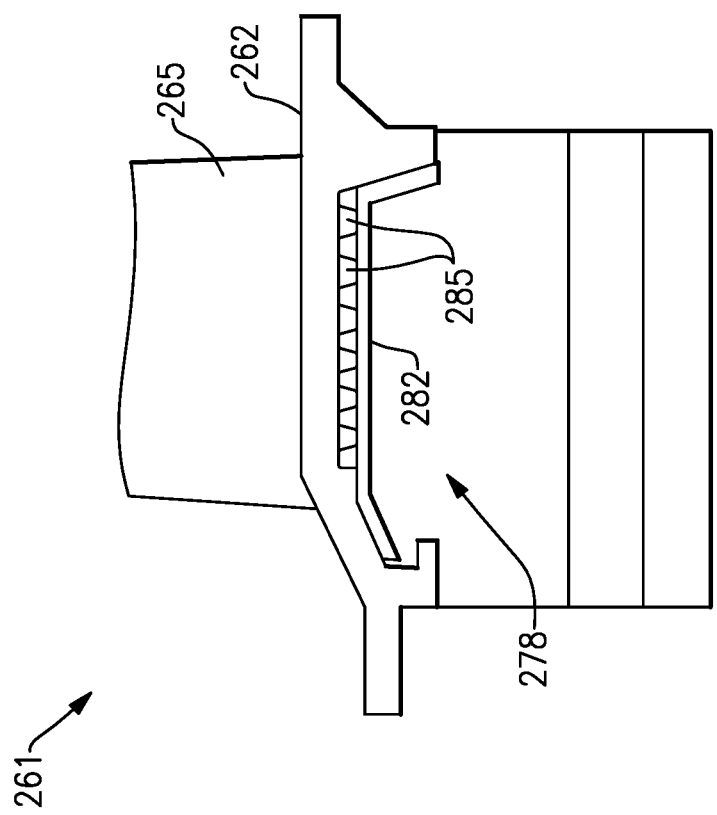
FIG. 4A illustrates a side view of a cooling arrangement for an airfoil and having a plurality of ridges with various geometries.

The ridges 185A, 185B can be configured having various geometries, such as a rectangular cross-sectional profile as shown by ridges 185A, 185B in FIG. 3A. Other geometries can include various curvatures as illustrated by ridges 285 in FIG. 4A, a trapezoidal cross-sectional geometry as shown by ridges 385A in FIG. 4B, fully radiused radially extending cross-sectional geometries as shown by ridges 385B (FIG. 4B) to minimize local stress concentrations associated with sharp edges, corners and inflection points, or a combination of geometries depicted by ridges 385A, 385B, for example. Various techniques for forming the ridges 185 can be utilized. In some embodiments, the ridges 185 are cast or additively manufactured. In another embodiment, the ridges 185 or grooves 186 are machined from a portion of the cold side surface 184.

The seal member 182 is arranged to abut or span across at least a portion of the ridges 185A, 185B to define a plurality of cooling passages 187. The seal member 182 includes one or more edge faces such as side faces 195 at ends of the seal member 182. Other edge faces can include a sealing surface 196 and an outer surface 197 extending between the side faces 195. The sealing surface 196 is configured to abut radial surfaces of the ridges 185A, 185B, and the outer surface 197 is spaced apart from the sealing surface 196. In some embodiments, ridges 185A, 185B are configured such that the outer surface 197 of the seal member 182 is spaced apart from the cold side surfaces 184B, 184B and other portions of the airfoil 161 at each position of the seal member 182.

Each of the cooling passages 187 includes an inlet 188 (shown in dashed line in FIG. 3B) in communication with the cooling cavity 175 adjacent to the distal end 191 of adjacent ridges 185, and an outlet 189 adjacent to the proximal end 190 of adjacent ridges 185 and in communication with the leakage gap 181. The inlets 188A, 188B are spaced apart from the mate faces 180A, 180B and leakage gap 181, and extend generally in the radial direction R, for example, between the cold side surfaces 184B, 184B of the platforms 162A, 162B and the seal member 182.

Figure 3C:
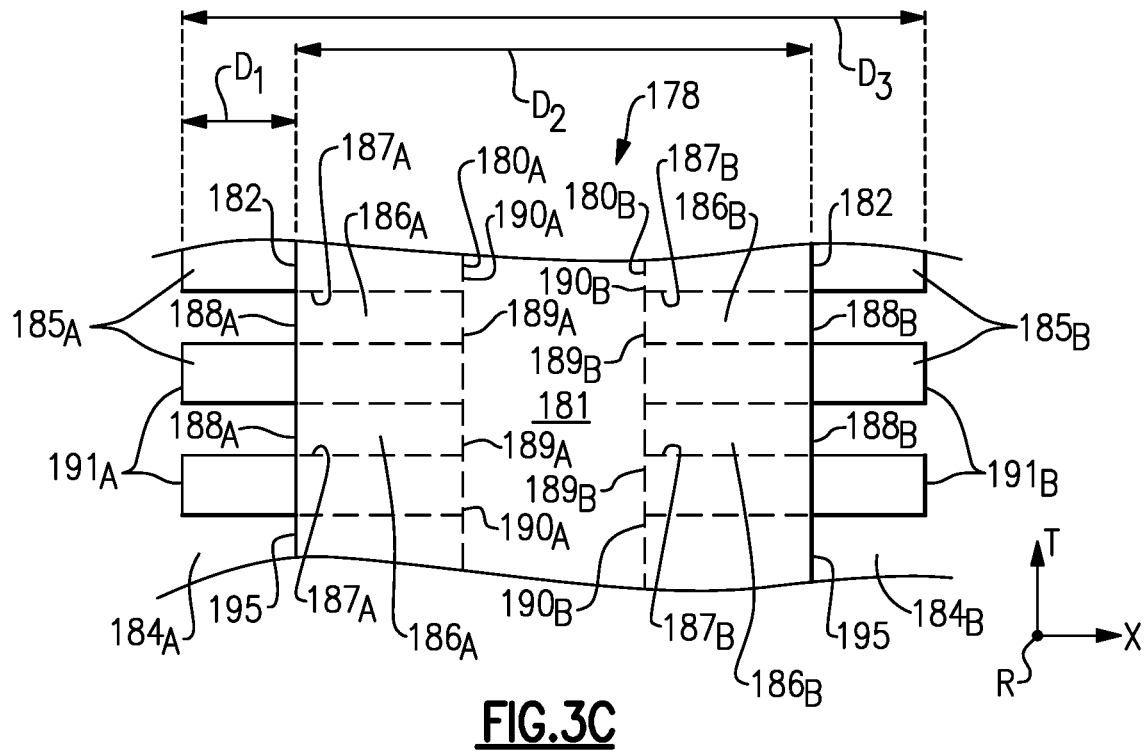
FIG. 3C illustrates a bottom view of selected portions the cooling arrangement of FIG. 3B with a seal member in a first position.

The seal member 182 can be dimensioned such that the seal member 182 is spaced a width D1 in the circumferential or thickness direction T from distal (or first) ends 191A, 191B of the ridges 185A, 185B, as shown in FIG. 3C. In some embodiments, the seal member 182 is dimensioned to define a width D2 in the circumferential or thickness direction T, and the outermost distal ends 191A, 191B of the ridges 185A, 185B define a width D3 in the circumferential or thickness direction T such that a ratio of the first width to the second width is equal to or less than 0.8, or more narrowly between 0.5 and 0.75. These arrangements permit additional cooling augmentation to portions of the platform 162 adjacent the cooling passages 187.

Figure 3D:
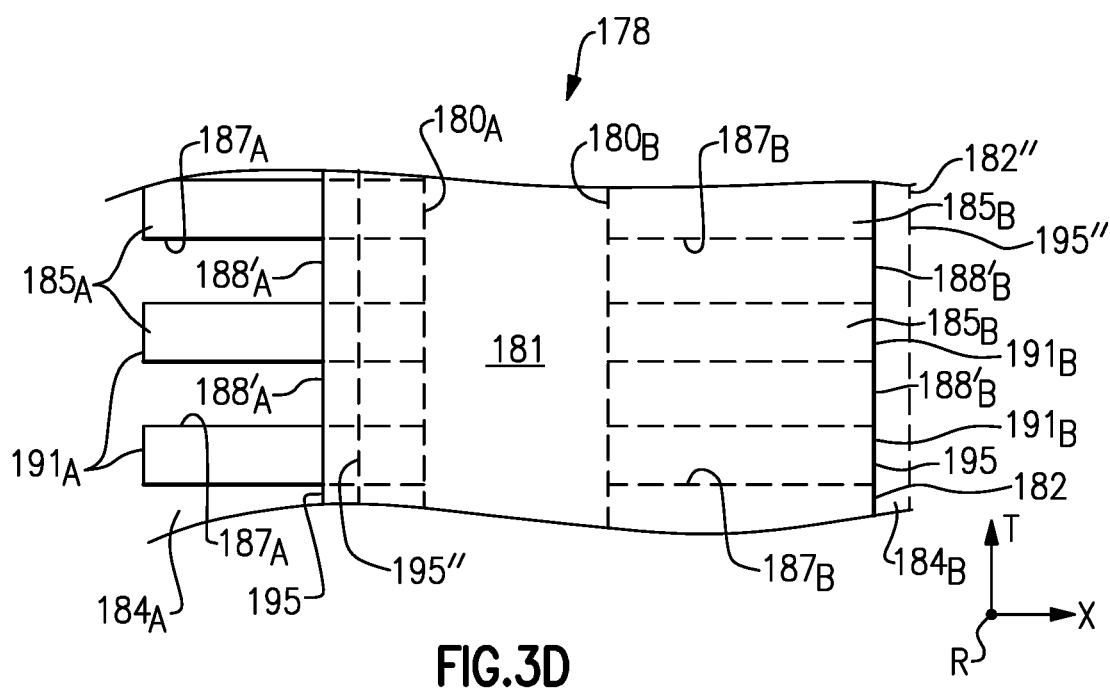
FIG. 3D illustrates a bottom view of selected portions the cooling arrangement of FIG. 3B with the seal member in a second position.

During operation, the seal member 182 may move circumferentially relative to the ridges 185A, 185B, as illustrated by different positions of the seal member 182 in FIGS. 3C and 3D. The seal member 182 is configured to move between a first position and a second position relative to the ridges 185A, 185B. For example, the seal member 182 can move between a first position spaced from the mate faces 180A, 180B (FIG. 3C) and a second position adjacent to ends of the plurality of ridges 185B (FIG. 3D) or ridges 185A, or even circumferentially past the ends of the ridges 185B. Accordingly, a location of each inlet 188 can change due to relative movement of the seal member 182 along the ridges 185A, 185B such that each of the cooling passages 187A, 187B includes a first inlet 188A, 188B defined at the first position (FIG. 3C) and a second, different inlet 188A', 188B' defined at the second position (FIG. 3D). In some situations, the inlets 188 are selectively defined at distal ends 191 of the ridges 185 and at an edge face of the seal member 182 such as one of the side faces 195, as illustrated by the arrangement of the seal member 182 relative to the distal ends 191B in FIG. 3C, and in other positions of the seal member 182 are spaced from the distal ends 191 of the ridges 185 as illustrated in FIG. 3D. The arrangement of the ridges 185A, 185B spacing the cold side surfaces 184B, 184B of the platforms 162A, 162B from the seal member 182 permits the inlets 188A, 188B to have a radial component, thereby allowing cooling airflow to enter the cooling passages 187A, 187B through the inlets 188A, 188B even when one or more edge faces of the seal member 182 is substantially aligned with the ends of at least some of the ridges 185. Thus, blockage of the inlets 188 caused by interaction of the seal member 182 and the cold side surfaces 184A, 184B can be reduced for each position of the seal member 182 relative to the ridges 185A, 185B.

Figure 6A:
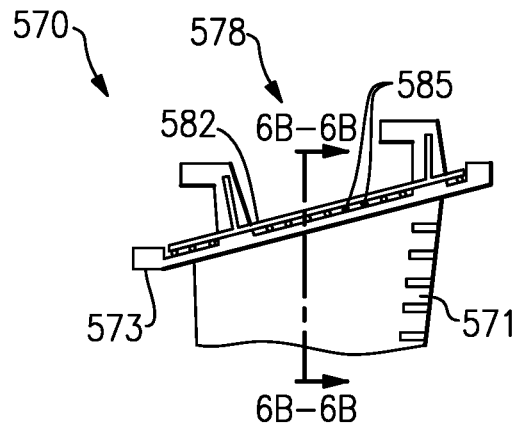
FIG. 6A illustrates a side view of a cooling arrangement for a vane.
Figure 6B:
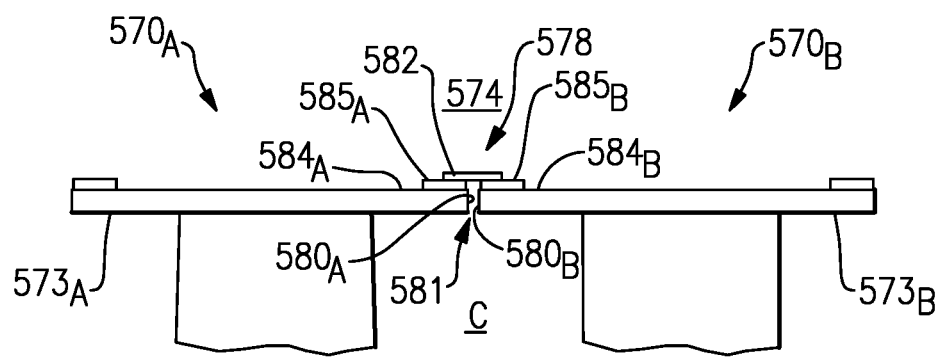
FIG. 6B illustrates a cross-sectional view of the cooling arrangement along line 6B-6B of FIG. 6A.
Figure 7:
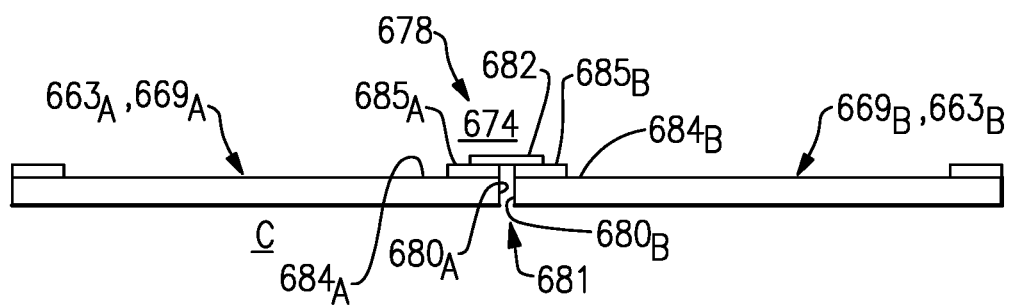
FIG. 7 illustrates a cross-sectional view of a cooling arrangement for an engine component.

Although the various cooling arrangements have been primarily discussed with respect to airfoils or turbine blades, the teachings herein can be utilized for other portions of the engine 20, such as one or more vanes 570 shown in FIGS. 6A and 6B, or one or more BOAS 669 or combustor panels 663 shown in FIG. 7. Although FIGS. 6A and 6B illustrate a cooling arrangement 578 adjacent to an outer platform 572 of vane 570, the cooling arrangement 578 can be utilized for an inner platform of a vane, such as inner platform 72 of vane 70 shown in FIG. 2.

Figure 5A:
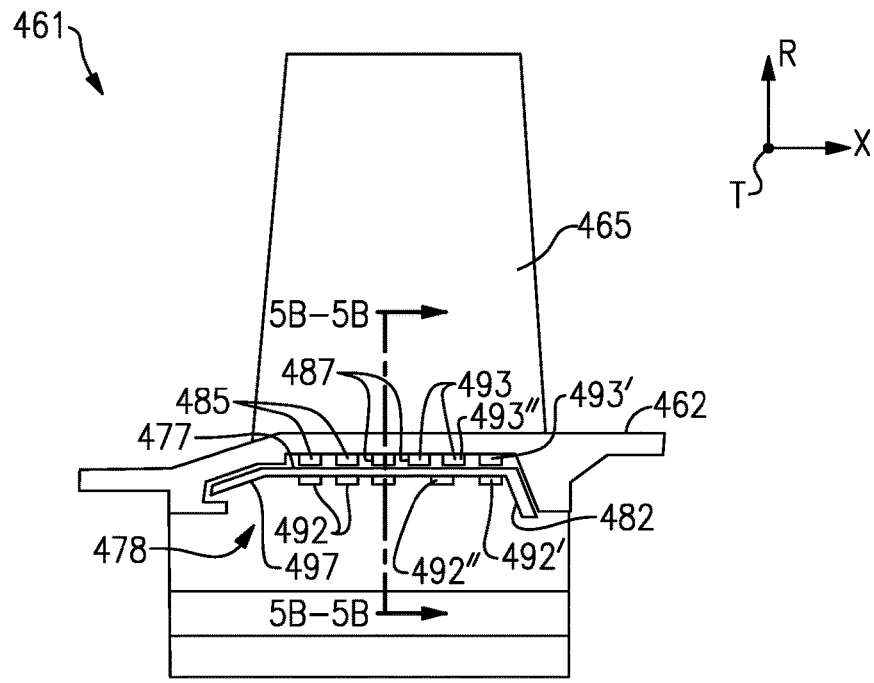
FIG. 5A illustrates a side view of a second embodiment of a cooling arrangement for an airfoil.
Figure 5B:
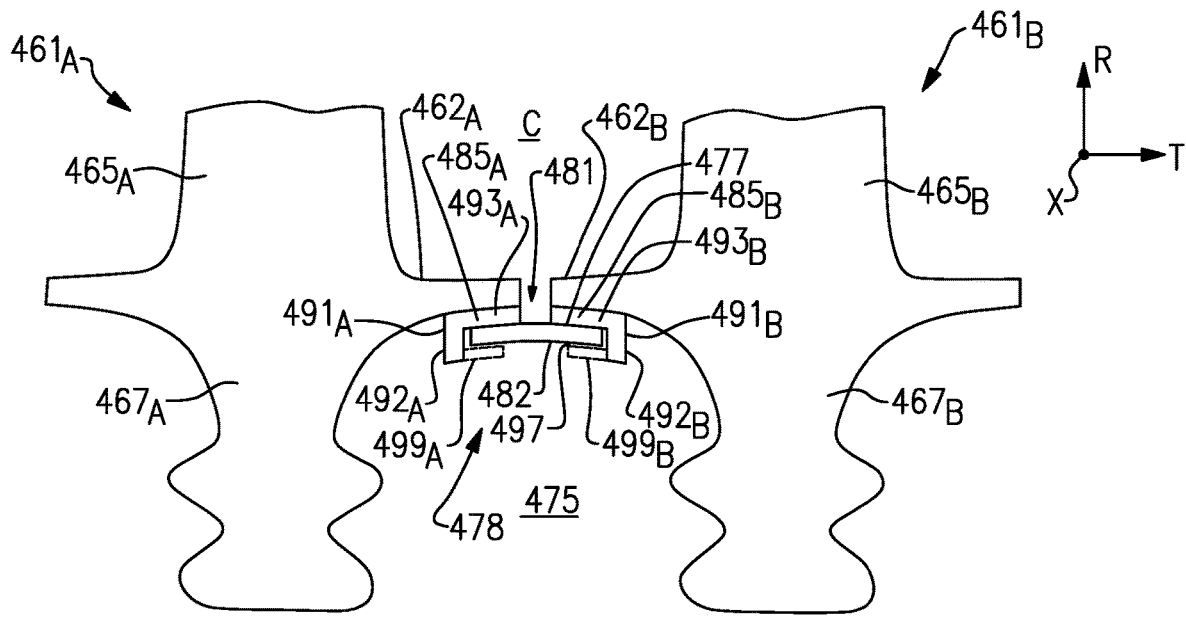
FIG. 5B illustrates a cross-sectional view of the cooling arrangement along line 5B-5B of FIG. 5A.
Figure 5C:
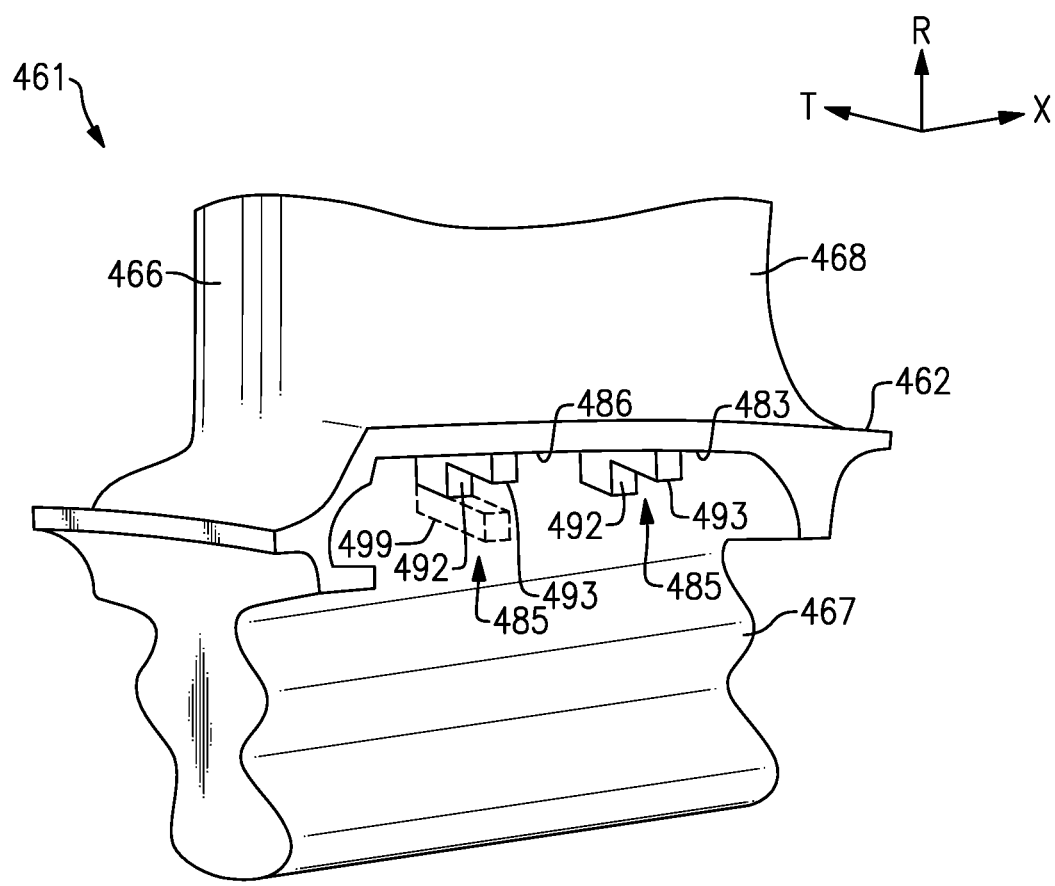
FIG. 5C illustrates an isometric view of selected portions of the airfoil of FIG. 5A.

FIGS. 5A to 5C illustrate a second embodiment of a cooling arrangement 478 for an airfoil 461, such as the one or more airfoils 61 of FIG. 2. The cooling arrangement 478 can also be utilized for a vane or BOAS, such as vane 70 or BOAS 69 of FIG. 2. In the illustrative embodiment, one or more ridges 485 include a first passage portion or main body 493 and a second passage portion or tab 492 transverse to the main body 493, such as a distal end 491 of the main body 493 (shown in FIG. 5B, with two ridges 485 shown in FIG. 5C and seal member 482 omitted for illustrative purposes). In alternative embodiments, each ridge 485 has a main body 493 and a tab 492. As shown in FIGS. 5A and 5B, the tab 492 can extend outboard of the seal member 482 in a radial direction R. The tabs 492 can be radially aligned with the main body 493, as depicted by tab 492' and main body 493', or axially offset or misaligned as depicted by tab 492" and main body 493" in FIG. 5A depending on a desired pressure drop through corresponding cooling passages 487 and heat augmentation characteristics. The tabs 492 are configured to selectively engage a seal member 482 to bound or limit movement of the seal member 482 relative to the ridges 485 in a circumferential or thickness direction T.

As shown in FIG. 5B, the seal member 482 can be dimensioned to be spaced from tabs 492A, 492B such that a length of cooling passages 487 is reduced. In alternative embodiments, the seal member 482 is configured to abut both sets of tabs 492A, 492B. One or more radial retention features 499 can extend from corresponding tabs 492 (one radial retention feature 499 shown in FIG. 5C for illustrative purposes), such as in a circumferential direction relative to the tabs 492. The tabs 492 are configured to abut an outer surface 497 of the seal member 482 to retain the seal member 482 within a desired radial position, as shown by tabs 492A, 492B in FIG. 5B, such that a likelihood of the seal member 482 becoming unseated during operation of the engine 20 is reduced. In the illustrative example, the radial retention features 499 can be abut a first or outer surface 497 of the seal member 482 opposite from a second or inner surface 477 of the seal member 482 abutting the first passage portion or main body 493. The number of radial retention features 499 can be selected depending on a desired pressure drop through corresponding cooling passages 487 and heat augmentation characteristics to surrounding portions of the airfoil 461.

Figure 9:
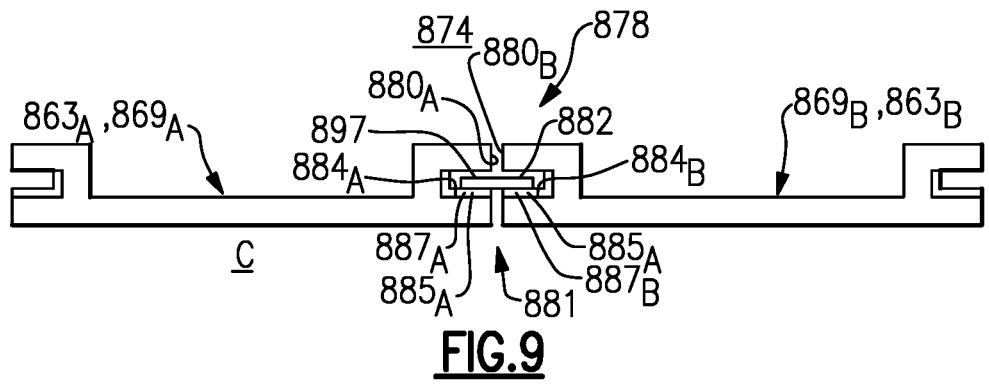
FIG. 9 illustrates a cross-sectional view of a cooling arrangement for an engine component.

An arrangement similar to the cooling arrangement 478 for airfoil 461 can be utilized for a vane, for example, as illustrated by cooling arrangement 778 of FIGS. 8A and 8B. Adjacent vanes 770A, 770B each include a slot 794A, 794B extending from mate face 780A, 780B. Each slot 794A, 794 is configured to receive a portion of seal member 782. One or more ridges 785 include a tab 792 extending in a radial direction R from a main body 793. The tabs 792 space the seal member 782 from walls of each slot 794 in a circumferential or thickness direction T to limit relative movement of the seal member 782. A cooling arrangement similar to cooling arrangement 778 of FIGS. 8A and 8B can be utilized for one or more BOAS 869 or combustor panels 863, illustrated by a cooling arrangement 878 of FIG. 9.

Figure 9A:
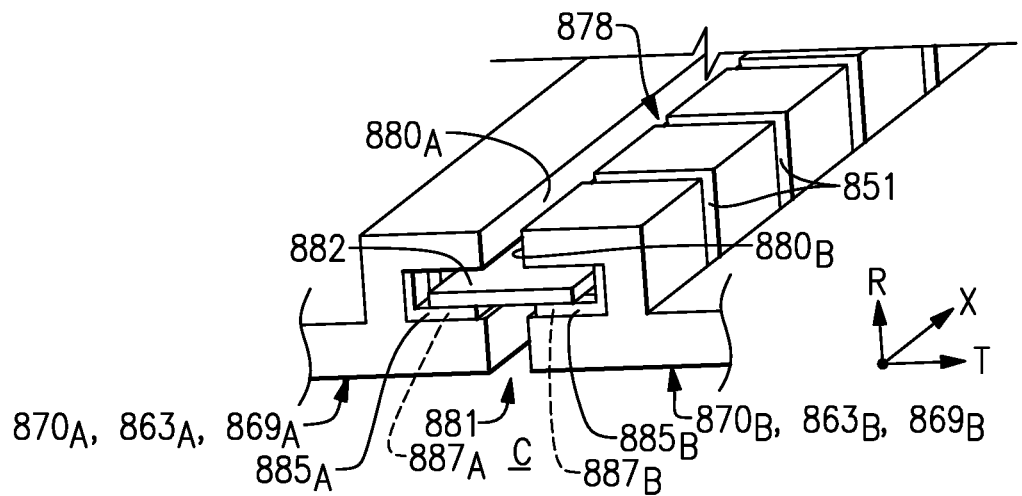
FIG. 9A illustrates a perspective view of selected portions of the engine component of FIG. 9.

Referring to FIG. 9A, the mate faces 780 can be continuous along portions of the leakage gap 881, as illustrated by mate face 880A. Portions of the mate faces 780 can be discontinuous or segmented along the leakage gap 881 to define one or more flow passages 851, as illustrated by mate face 880B. The flow passages 851 provide multiple cooling flow sources or source pressures to the cooling passages 887 rather than a single source pressure provided by adjacent mate faces having a continuous arrangement. The flow passages 851 reduce an overall pressure drop through the cooling arrangement 878, thereby reducing a quantity of cooling airflow corresponding to a desired heat augmentation and also reducing a likelihood of entrainment of hot combustion products from the core flow path C entering into the leakage gap 881.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine, comprising:
    a component comprising:
        a body including a cold side surface adjacent to a mate face; and
        a plurality of ridges extending from the cold side surface;
    a seal member abutting the plurality of ridges to define a plurality of cooling passages, the seal member moveable between a first position and a second position relative to the plurality of ridges when in an installed position, each of the plurality of cooling passages including a first inlet defined at the first position and a second, different inlet defined at the second position, and each of the plurality of cooling passages includes an outlet adjacent to the mate face;
    wherein each of the plurality of ridges includes an elongated main body and a retention tab, the main body extends in a circumferential direction along the cold side surface between opposed first and second ends, the respective outlet is established at the second end, and the retention tab extends from the first end such that the retention tab extends outward of the seal member in a radial direction; and
    wherein the retention tabs of the plurality of ridges are spaced apart from one another in an axial direction and are arranged in a row to bound movement of the seal member along the plurality of ridges in the circumferential direction.

2. The assembly as recited in claim 1, wherein the seal member is dimensioned such that the seal member is spaced a distance from the first end when the seal member is in the first position.

3. The assembly as recited in claim 1, wherein the plurality of ridges each include a radial retention feature extending in the circumferential direction from a respective one of the retention tabs towards the second end such that the seal member is trapped in the radial direction between the main body and the radial retention feature.

4. The assembly as recited in claim 3, wherein:
    each of the plurality of ridges has a C-shaped geometry established by the main body, the retention tab and the radial retention feature; and
    wherein the radial retention features of the plurality of ridges are spaced apart from one another in the axial direction.

5. The assembly as recited in claim 3, wherein the radial retention feature of at least one of the retention tabs is misaligned in the axial direction from the respective main body.

6. The assembly as recited in claim 3, wherein the seal member is a feather seal dimensioned to extend outwardly of the plurality of ridges with respect to the axial direction.

7. The assembly as recited in claim 1, wherein the cold side surface is located at a slot extending inwardly from the mate face, and the slot receives the seal member.

8. The assembly as recited in claim 1, wherein the assembly is one of an airfoil, a blade outer air seal (BOAS), and a combustor panel.

9. The assembly as recited in claim 8, wherein the airfoil includes an airfoil section extending in the radial direction from a platform, and the cold side surface is located at an undersurface of the platform.

10. The assembly as recited in claim 9, wherein the airfoil is a turbine blade.

11. A gas turbine engine, comprising:
    a first component including a first set of ridges protruding from a first cold side surface adjacent to a first mate face;
    a second component including a second set of ridges protruding from a second cold side surface adjacent to a second mate face, the second mate face circumferentially adjacent to the first mate face relative to a circumferential direction to define a leakage gap; and
    a feather seal abutting the first set of ridges to define a first set of cooling channels and abutting the second set of ridges to define a second set of cooling channels such that the feather seal spaced apart from the first cold side surface and the second cold side surface;
    wherein each of the first and second sets of ridges includes an elongated main body and a retention tab, the main body extends in the circumferential direction along a respective one of the first and second cold side surfaces between opposed first and second ends, the second end is adjacent to a respective one of the first and second mate faces, and the retention tab extends in a radial direction from the first end such that the retention tab extends outward of the feather seal; and wherein the retention tabs of the first set of ridges are spaced apart from one another in an axial direction and are arranged in a row to bound movement of the feather seal along the first set of ridges in the circumferential direction.

12. The gas turbine engine as recited in claim 11, wherein each of the first and second sets of cooling channels includes an inlet spaced apart from the leakage gap and an outlet adjacent to the leakage gap.

13. The gas turbine engine recited in claim 11, wherein the first set of ridges each include a radial retention feature extending in the circumferential direction from a respective one of the retention tabs towards the respective second end such that the seal member is trapped in the radial direction between the main body and the radial retention feature.

14. The gas turbine engine as recited in claim 11, wherein the feather seal defines a first width in the circumferential direction, and the first ends of the first and seconds set of ridges define a second width in the circumferential direction, and a ratio of the first width to the second width is equal to or less than 0.8.

15. The gas turbine engine as recited in claim 11, wherein each of the first component and the second component is one of an airfoil and a blade outer air seal (BOAS).

16. The gas turbine engine as recited in claim 14, wherein the first component is an airfoil, the airfoil includes an airfoil section extending in the radial direction from a platform, the platform includes an upper surface bounding a core flow path and an undersurface bounding a cooling cavity, and the first cold side surface is located at the undersurface of the platform.

17. The gas turbine engine as recited in claim 16, wherein the main body is raised from the undersurface of the platform such that the feather seal is spaced apart from the undersurface relative to the radial direction.

18. A method of sealing between adjacent components of a gas turbine engine, comprising:

positioning a feather seal across a leakage gap defined between mate faces of adjacent components, and along a plurality of ridges to define a plurality of cooling passages;

wherein the plurality of ridges protrude from cold side surfaces of the adjacent components such that the feather seal is spaced apart from the cold side surfaces;

wherein each of the plurality of ridges includes an elongated main body and a retention tab, the main body extends in a circumferential direction along the cold side surface between opposed first and second ends, a respective outlet is established at the second end, and the retention tab extends in a radial direction from the first end such that the retention tab extends outward of the feather seal;

wherein the retention tabs of the plurality of ridges are spaced apart from one another in an axial direction and are arranged in a row to bound movement of the feather seal along the plurality of ridges in the circumferential direction;

wherein each of the plurality of cooling passages includes an inlet that is spaced apart from the mate faces at each position of the feather seal relative to the plurality of ridges; and moving the feather seal in the circumferential direction between a first circumferential position and a second circumferential position relative to the plurality of ridges when in an installed position, and wherein the plurality of ridges are arranged such that the inlet is established at the first circumferential position and the inlet is established at the second circumferential position.

19. The method as recited in claim 18, comprising communicating coolant from a cooling cavity to the plurality of cooling passages when an edge face of the feather seal is aligned with the first end of at least some of the plurality of ridges.

20. The method as recited in claim 18, wherein the plurality of ridges each include a radial retention feature extending in the circumferential direction from a respective one of the retention tabs towards the respective second end such that the seal member is trapped in the radial direction between the main body and the radial retention feature.

21. The gas turbine engine as recited in claim 12, wherein the second end of the main body is spaced apart from the respective one of the first and second mate faces with respect to the circumferential direction.

22. The gas turbine engine as recited in claim 12, wherein respective floors of the first set of channels extend in the circumferential direction along the first cold side surface, respective floors of the second set of channels extend in the circumferential direction along the second cold side surface, first circumferential openings of the first set of channels are established between the adjacent pairs of the first set of ridges at the first end such that the first cold side surface extends along the respective floors and then outwardly of the first circumferential openings with respect to the circumferential direction, and second circumferential openings of the second set of channels are established between the adjacent pairs of the second set of ridges at the first end such that the second cold side surface extends along the respective floors and then outwardly of the second circumferential openings with respect to the circumferential direction.

* * * * *